United States Patent [19]

Mancino

[11] Patent Number: 5,051,776
[45] Date of Patent: Sep. 24, 1991

[54] CALIBRATION METHOD FOR COLOR PHOTOGRAPHIC PRINTING

[76] Inventor: Philip J. Mancino, Box 19A, Squankum-Yellowbrook Rd., Farmingdale, N.J. 07727

[21] Appl. No.: 490,283

[22] Filed: Mar. 8, 1990

[51] Int. Cl.$^5$ .................... G03B 27/80; G03B 27/32
[52] U.S. Cl. .................................................. 355/77
[58] Field of Search ............... 355/38, 68, 77; 358/80, 358/76

[56] References Cited

U.S. PATENT DOCUMENTS 4,393,398  7/1983  Horiguchi et al. ............... 358/76
4,769,696  9/1988  Utsuda et al. .................... 358/80

Primary Examiner—L. T. Hix
Assistant Examiner—D. Rutledge
Attorney, Agent, or Firm—David Peter Alan

[57] ABSTRACT

A method is disclosed for quickly and efficiently calibrating the color filtration levels of a photographic enlarger for the characteristics of the printing paper on which prints are to be made, and subsequently adjusting the enlarger for optimize adjustment of the color values for final printing. A test print is made of a standard transparency in the conventional manner. A charge coupled device (CCD) TV camera is then substituted for the printing paper. The output of this camera is connected to a video monitor and to an oscilloscope set to show the amplitude of its output over time. The input of this camera is adjusted to match the color values of the first test print, and the enlarger is adjusted so that the colors in the image showing on the video monitor screen are correct. The transparency to be printed is then substituted for the standard transparency and the enlarger adjusted for correct color filtration levels for the transparency to be printed. Inspection of the waveform on the oscilloscope and the image on the video monitor reveals enlarger settings for proper color balance. The electronic components of the system are then removed and prints made in the conventional manner. The method described allows for speedy and efficient calibration of the enlarger for the printing paper used and easy correction of color errors in the negative or positive transparency to be copied by allowing visual inspection of the image as it would appear in a final print.

6 Claims, 1 Drawing Sheet

CALIBRATION METHOD FOR COLOR PHOTOGRAPHIC PRINTING

BACKGROUND OF THE INVENTION

The invention relates to photographic printing, specifically to the calibration of color filtration in the enlarger head to provide proper color values in a finished print, corresponding to the characteristics of the printing paper used.

In the conventional art, color printing is a long and laborious process, especially calibrating the color levels in the enlarger to the printing paper to produce a color print that replicates, as closely as possible, the colors in the scene actually photographed.

Each batch of photographic paper has its own idiographic filtration characteristics, requiring that the color filtration in the enlarger be specifically calibrated for the batch of printing paper which the photographer wishes to use. This process can be extremely laborious, requiring several steps. In the conventional art, a test print is made, using a standard negative, with the filtration levels recommended in the directions accompanying the photographic paper. For example, in printing from a color negative, the recommended level is 40M+50Y, the magenta level on the enlarger will be set at 40 and the yellow level at 50 (the cyan level is rarely adjusted). A test print will then be exposed and developed, using standard methods. The photographer then views the resulting test print through colored viewing filters until the resulting image appears to be in proper color balance. The photographer then adjusts the filtration levels on the enlarger (normally only the yellow and magenta levels) and makes a new test print. In addition, the density of light is adjusted by changing the exposure time to darken or lighten the resulting print. Once the second test print is made, the photographer again views the resulting print through viewing filters and again adjusts the color filtration levels on the enlarger to obtain a color balance that appears to more closely resemble that of the scene originally photographed. Eventually this process results in an acceptable calibration, although the process can require up to seven or eight iterations. It should be noted that this process can take a large amount of time, since each iteration can take approximately 15 minutes. This is time-comsuming work for the hobbyist who must expend an hour or more before beginning to print pictures. For the professional photographer or for the processing lab which makes prints for customers, a more efficient method of calibrating color levels than is now in use would save on professional time and labor costs.

As will be shown, the present invention uses electronic means to reduce the number of steps required to calibrate an enlarger for the particular printing paper used. It is, therefore, an objective of the present invention to save time for the photographer or photographic lab technician. In professional or commercial situations, this time saving also represents a saving of money.

The method described here also allows for easier visual inspection of negatives for which color correction is difficult, for such reasons as age, film deterioration or off-color characteristics of the film originally used. The present invention vastly simplifies the process of calibration for such negatives and allows an acceptable-quality print with much less work than is now required to produce it. Accordingly, a further objective of this invention is to facilitate adjustment of color levels for "difficult" negatives. This is especially important when producing composite prints when may contain several such "off-color" negatives.

In short, the system described here introduces the substitution of a Charge Coupled Device (CCD) TV camera for the printing paper in the enlarger for the purpose of visual inspection a standard TV (CRT) monitor of the color values that would result if the image in the enlarger were to be printed. The system can reverse the polarity of a negative to display a positive image on the screen. This is accomplished by reversing the relationship between black and white and inverting the primary colors; red to cyan, green to magenta and blue to yellow. Use of a waveform monitor facilitates elimination of "off color" information, making adjustment of color values for a specific negative much easier than in the conventional practice. Polarities are not reversed for color transparencies.

This system operates in a different field from the prior art. Much of the art in the color photography field concerns chemical advances for photographic use (e.g. Viola: U.S. Pat. No. 4,304,837; Vary: U.S. Pat. No. 3,764,330) or new advances in electrophoretic photography, such as used in color copy machines (e.g. Hiranuma; U.S. Pat. No. 4,580,889). The method claimed here uses conventional photochemical methods and provides for a method of preparation for printing that is much more efficient than the methods now in use.

Other methods recently introduced into the art add color for artistic (Purro: U.S. Pat. No. 4,455,369) or illustrative (Edwards: U.S. Pat. No. 4,714,334) purposes. The system described here does not add color; it helps to replicate the color that was present in the scene as originally photographed. Moreover, it does this without resorting to new chemistry (see Giorgi: U.S. Pat. No. 4,717,646 (use of anhydrous diacetone rinse)). Other prior art adds to traditional darkroom technique, but not in the same way as the invention claimed here. Kirby U.S. Pat. No. (3,685,900) teaches an exposure calculator, but his method deals with density and not color values. Brault U.S. Pat. No. (4,081,277) teaches filter layers over light sensors but does not provide for adjustment of the color levels in the enlarger to facilitate color printing.

Even the most technically-complex advances in color reproduction differ markedly from the invention described here. Fukuchi U.S. Pat. No. (4,825,246) teaches a new method of color processing by breaking a color image down into complementary red and cyan components. That method, however, requires a complicated apparatus for its practice. The Wittocx system U.S. Pat. No. (4,810,602) photographs images shown on a TV monitor, broken down into their red, blue and green components. Each color separation is photographed through an appropriate filter to produce a corrected image. While the Wittocx system produces accurate color for such purposes as medical illustration, the system described here is designed to enhance the efficiency of the practice of the photographer's art, not to replace it with a precision that is unnecessary and undesirable. The system described here does not encompass the photographing of a CRT image; it uses such an image for calibration purposes before a negative is printed. Okino U.S. Pat. No. (4,810,603) teaches a complex method of correcting color tonality that requires filters, mirrors, digitizing circuits and feedback loops with the necessity of a new and complex apparatus. In the present system, there is no need for complicated apparatus. In the Merlo system U.S. Pat. No. (4,259,423) a wheel containing filters of the three primary colors breaks down an image and digital circuitry is used to adjust exposure time. Again, the process requires specific apparatus for its practice. The system described here processes only analog information and requires no new circuitry or logic.

It should again be noted that the objective of the invention described here is to render the practice of the photographic art more efficient than it is now by using available instruments in a novel manner. In effect, the method claimed here uses techniques associated with television technology to streamline a labor-intensive process which forms a necessary part of the photographer's work.

BRIEF DESCRIPTION OF THE INVENTION

The present invention is a method for efficiently calibrating filtration in a color enlarger to provide for accurate color reproduction on the specific paper used for making color prints. As described previously, the process of calibrating filtration levels for a particular batch of printing paper is a laborious and timeconsuming one in the conventional art. The present invention makes the process more efficient by adding an electronic means to aid in visual inspection for calibration purposes, thus eliminating much of the trial-and-error effort from the process.

The central feature of the invention is the substitution of a Charge Coupled Device (CCD) TV camera for the paper in the enlarger and the display of the resulting image on a CRT (TV) monitor. The monitor must be properly calibrated, but it is otherwise a standard monitor which requires no modifications. An oscilloscope used to produce a waveform corresponding to the amplitude of light intensity is placed in the system to allow for easy elimination of color error in white areas of the picture for which adjustment is made. In operation, a field lens is inserted below the standard lens in the enlarger, producing an aerial image on the field lens. Another prime lens is inserted below the field lens, which focuses the image onto the plane of the CCD camera. The output from the camera then contains the image from the negative in the enlarger, electronically reversed in polarity. In the case of a positive transparency, the image is not reversed in polarity. This image (analog in nature) is then fed through a waveform monitor and onto a CRT monitor screen. Visual inspection of the waveform on the oscilloscope allows easy adjustment of the yellow and magenta filtration levels on the enlarger to eliminate "off color" information that constitutes color errors. The CRT monitor allows visual inspection of the color that is actually transmitted through the transparency in the enlarger (or its inverse, in the case of a negative). This is the color that would actually reach the printing paper, if it were in its usual place in the enlarger.

It should be noted that the present system does not aid in the density adjustment; the exposure time in the enlarger that determines whether a print is dark or light. It aids in the setting of color filtration levels so that the resulting print will match the colors of the scene as originally photographed.

In operation, the method begins with a step that is part of conventional darkroom technique. A test print is made using the filtration levels suggested by the manufacturer for the particular batch of printing paper to be used. In the conventional technique, the operator would look at the resulting print through viewing filters and adjust the color values on the enlarger to make the image look more natural. Then another print would be made and the process would be repeated. After several iterations, a test print would look acceptable to the operator and the enlarger would be calibrated for the printing paper to be used. Then the operator could begin making prints from the negatives (or positive transparencies) he or she wished to copy onto paper.

The present system is placed into operation after the first test print is made. The operator adjusts the sensitivity on the CCD camera to match the off-color characteristics of the print that was just made. This, in effect, adjusts the camera to simulate the color characteristics of the printing paper. The yellow and magenta levels on the enlarger are then adjusted (in typical practice) until the image on the TV screen appears to have correct color values, as the operator observes it. The enlarger is thereby calibrated for the batch of filter paper to be used. The steps of resensitizing the camera to match the characteristics of the paper and then adjusting the enlarger for proper color balance replaces several iterations of trial and error in calibrating the enlarger. A test print made after these steps should be in proper color balance. If not, the levels should be sufficiently close to correct that only one further iteration should be required. It should be noted that the waveform monitor is not used in this step.

Once the system is calibrated, it is ready to begin the actual printing operation. The transparency to be printed is inserted into the enlarger in the normal manner and the system is adjusted to achieve proper color balance for that particular transparency.

In order to adjust the system for this step, the waveform monitor is used. The output from the camera is fed to an inversion circuit and then to the vertical input terminals of an oscilloscope, with the horizontal input set to an appropriate time sweep, of sufficiently high frequency to generate a stable trace. The method as described is used for printing from a negative, while the inversion circuit is bypassed when printing from a positive transparency. If the negative to be printed contains no color error, the waveform on the oscilloscope trace will be sharp, representing an absence of excessive (incorrect) chroma information and the presence of only the amplitude of the white reference level. To achieve this absence of chroma information, the operator must adjust the yellow and magenta levels on the enlarger until the line on the oscilloscope trace is as sharp as possible. This corresponds to the elimination of color error. Visual inspection of the TV monitor is also possible, and such inspection should reveal that the color appears correct. The camera is then removed (along with the field lens and the prime lens above it) and the paper for which the system was calibrated is returned to the enlarger. A print can then be made in the conventional manner. Filter settings for each negative (or positive transparency) can be noted for making prints in the future, or for making composite prints.

DETAILED DESCRIPTION OF THE INVENTION

Figure 1:
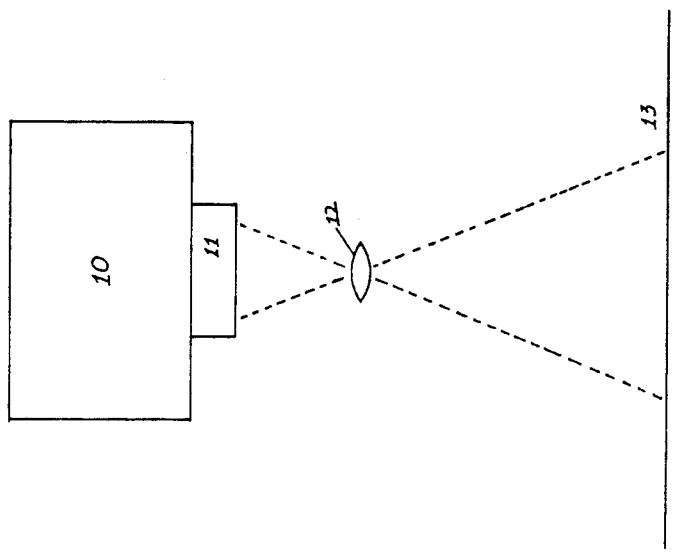
FIG. 1 represents a schematic diagram of a photographic enlarger in operation for making prints in the conventional manner.

A photographic enlarger, as used in the conventional photographic printing art, is shown in FIG. 1. Light eminates from the enlarger head, which is the standard color subtractor variety. Inside enlarger head 10 are a light source and filters representing the inverse primary colors; yellow, magenta and cyan. In practice, the cyan filter is not customarily adjusted for negative material; the yellow and magenta levels are adjusted to accommodate the specific characteristics of the emulsion in the printing paper to be used. Photographic negative or color transparency material 11 is inserted below the enlarger light source in the conventional manner. Light eminating from head 10 passes through negative or color transparency material 11 and enlarger lens 12, where it is intensified, and onto photographic paper 13, which is anchored to the enlarger table. A print is then made.

The present invention requires the substitution of electronic monitoring equipment to substitute for the printing paper while the enlarger is calibrated for color balance to accommodate the printing paper to be used.

Figure 2:
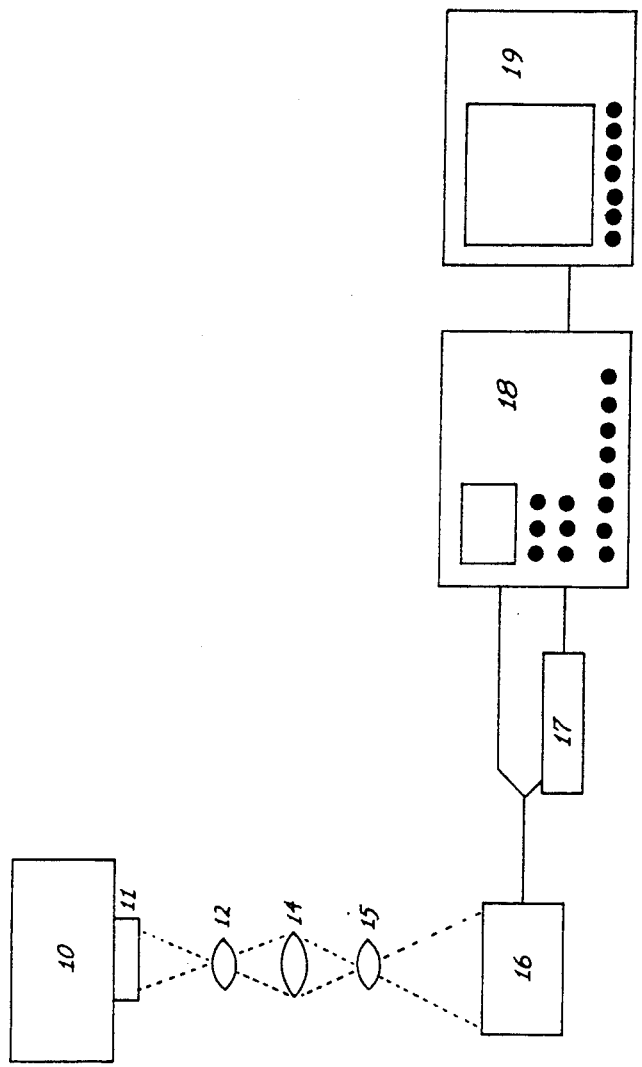
FIG. 2 represents a schematic diagram of a photographic enlarger modified for calibration in accordance with the method described here, with the addition of the electronic equipment required for operation of the method described here.

In operation, the first test print is made in the conventional manner, using the filtration adjustments for yellow and magenta levels as recommended by the manufacturer of the printing paper. Once this print is made, the present system (shown in FIG. 2) is substituted for conventional operation of the enlarger.

In the present system, enlarger head 10, negative or positive transparency 11 and enlarger lens 12 remain the same as in conventional operation. The remainder of the system substitutes for paper 13. Field lens 14 is added below enlarger lens 12. In the preferred embodiment of the invention, field lens 14 has a focal length of two inches and is one and one-half inches in diameter. Size is not critical, although the focal length must be sufficiently short as to allow the physical insertion of the field lens, prime lens and CCD camera into the space between the enlarger lens and the enlarger table. Field lens 14 is positioned near enlarger lens 12 and is designed to produce an aerial image on the front element of field lens 14. This image is smaller than the image of negative or positive transparency 11 and is the reverse of the image on the negative or positive trnasparency 11. Below field lens 14 is prime lens 15, which intensifies the light passing through the aerial image on field lens 14. Prime lens 15 then focuses the image onto the receiving surface of CCD camera 16, which photographs it electronically. In the preferred embodiment of this inventon, prime lens 15 is a standard 50 mm projector lens. A standard CCD TV camera is suitable for the invention as described. It should be noted that there is no modification at this point, except that a standard blue filter is needed to correct for the orange masking that is added to color negatives. This blue filter is not required if positive color transparencies are used, as they do not have an orange mask.

The output of camera 16, carrying analog information of signal amplitude (white reference) and intensity of each of the three primary colors, is fed into inverting circuit 17, in the case of a color negative. This circuit, of standard manufacture, reverses the polarity of the negative, so that the image will appear as a normal positive on the screen. Inversion circuit 17 reverses black and white and inverts primary colors; yellow to blue, magenta to green and cyan to red. It should be noted that this circuit is only needed for the evaluation of negatives and is switched out of the system for positive transparencies. The inverted signal (or unmodified output from camera 16, for a positive transparency) is then fed to the vertical input of oscilloscope 18. Any oscilloscope which will accommodate a bandwidth of 4.5 MHz. is suitable for this operation. The horizontal input is a time sweep of sufficiently high frequency and synchronized to generate a waveform that appears stable. The output from oscilloscope 18 is then fed into CRT monitor 19. A standard monitor is suitable, as long as it is correctly calibrated for red, blue and green levels.

In actual operation, a test print is made form the standard negative or color transparency, in the conventional manner. There is no electronic augmentation at this point. This print is made using the manufacturer's recommended filter setting for the paper on which the print is made. The test print is developed in the normal manner and then inspected.

Most likely, it will appear off color. Camera 16 is then adjusted at its input until the image on monitor screen 19 matches that of the test print that was just made. Essentially, the errors in color values should appear to be the same on both the test print and the monitor screen. Enlarger head 10 is then adjusted so that visual inspection of monitor screen 19 reveals an image that appears to be in proper color balance. When this occurs, the yellow and magenta levels on enlarger 10 (typically) are calibrated for the paper on which prints are to be made and these levels should be recorded for future use with paper from the same batch. Another test print made at this time should reveal proper color balance. It may be necessary to adjust density (exposure time), or further color adjustment may be necessary, although this is unlikely. It is highly unlikely that any remaining error cannot be corrected in one further iteration.

When making a print, field lens 14, prime lens 15 and camera 16 are physically removed from the enlarger light path and paper 13 is placed in its usual place in the enlarger for the conventional printing operation. It should be noted that, in the preferred embodiment of this invention, field lens 14 and prime lens 15 are inserted as an easily-removable unit and camera 16 is physically placed below this lens unit to receive the light passing through it.

Once the system is calibrated in this manner, printing of the negative or transparency to be reproduced begins. The standard negative or transparency that was used for calibration purposes is replaced with the "unknown" negative or positive transparency to be printed. This is done in the conventional manner, as specified for the enlarger which is used. The assembly of field lens 14 and prime lens 15 is then put in place, along with camera 16. An image of the material to be copied appears on monitor screen 19 and a waveform appears on oscilloscope 18. Both are used to adjust enlarger 10 for the color filtration necessary to obtain accurate color reproduction of the transparency now mounted in the enlarger.

The waveform on oscilloscope 18 represents the amplitude of the white reference level, shown against time. In a black-and-white picture, the lines of the waveform would be sharp, indicating that there was no chroma information present, only light intensity. In actual operation, there will be some color information present, indicating the presence of some color in the "white" areas of the picture to be copied. This information represents "off color" that is essentially an error signal, to be eliminated by adjusting the filters on enlarger 10. Typically, yellow and magenta levels are adjusted; cyan is only adjusted in the event of such wide deviations from true color that adjustment of yellow and magenta alone cannot correct them.

Filtration settings on enlarger 10 are adjusted while watching the waveform on oscilloscope 18. Color error is reflected by "fuzziness" in the waveform as seen. Adjusting the yellow and magenta levels on enlarger 10 until the waveform on oscilloscope 18 is as sharp as possible serves to minimize the amount of chroma information reching camera 16 from the "white" area of the picture. When the waveform is sharpest, the color error is minimized for the picture to be copied. Visual inspection of the image on monitor screen 19 aids in the adjustment process, and further adjustments can be made to obtain a print that appears correctly balanced for color, as the operator sees it. The settings on enlarger 10 can then be recorded for use in making prints of the same negative in the future, on paper from the same batch for which the calibration of the enlarger was originally undertaken. The field lens, prime lens and camera may now be removed and prints made according to the normal method of operation of the enlarger.

The invention described here uses electronic means to allow the operator to "preview" what a print of a specific negative or positive transparency would look like on paper from a specific batch. It also allows the operator to see the difference that adjustments of any of the filters in the enlarger would make, thereby enabling the operator to quickly and efficiently optimize the "look" of the image to be printed. The "look" of the resulting print is also optimized by the process described.

This system saves time and labor in the calibration process by allowing quick and easy compensation for the particular characteristics of the printing paper to be used. It also allows easy previewing and adjustment for any negative or positive transparency, thereby optimizing the results obtained the first time any specific transparency is printed. By this method, many steps of trial and error, finally resulting in an acceptable print, are eliminated and the results are improved. In this manner, the method described here saves time for photographers and photographic techinicians. It saves time for both the hobbyist and for the professional. Furthermore, in the commercial situation, it saves time for the professional photographer or technician, whose time must be compensated in money. The method shown here can save up to one hour on the calibration process and up to one half hour on the process of custom printing the negative or positive to be reproduced.

In addition to the increased efficiency and productivity obtained in the operation of printing single images, an even further saving is obtained in the production of composite photographs. In the composite operation, it is necessary to adjust the enlarger for each negative or positive to be printed, since each image to be printed may have different color values or errors. Several iterations could be necessary for each image, and this process would have to be repeated for as many images as are to form the composite. If, for example, it takes an average of three iterations to adjust the enlarger for each image to be copied and six images are needed for a composite picture, eighteen test prints must be made before the final product is obtained. Using the present method, filtration can be adjusted for each negative by inspection of the waveform and image on the monitor screen, and the enlarger settings noted. Only one exposure for each image is necessary, with the enlarger readjusted for each image to be printed as part of the composite. Then printing can begin.

The dynamic range of the system described particularly lends itself to the printing of negatives which have deteriorated with age or for any other reason. Large-scale adjustments can be made by visual inspection. Nearly any negative or positive transparency, no matter how off-color, can be easily printed with satisfactory results. When composite prints are made from several images that contain such errors; the results, both in appearance and in savings of time, are particularly noteworthy.

The embodiment described is illustrative and not limiting, and the method described can be used with any type of photographic film, in any format, with any enlarger with a color-subtractor head. Other such embodiments should be considered as lying within the scope of the invention.

I claim:

1. A method for calibrating a color photographic enlarger to conform to the characteristics of the paper on which photographic prints are to be made and subsequently adjusting such enlarger to minimize color error in the prints made from each transparency placed therein, with the result of optimizing color reproduction in the prints resulting from the use of such method, comprising: making a test print using conventional means, according to the filtration values recommended by the manufacturer for the printing paper to be used, of a standard transparency commonly used for calibration purposes; substitution of a camera capable of producing a video image on a cathode ray tube or similar device, for the printing paper, the output of said camera further connected to a color video monitor and the vertical input of an oscilloscope whose horizontal input is determined by a sweep of sufficiently high frequency to enable the resulting waveform to appear as solid lines along the length of the trace on the screen of the oscilloscope; adjustment of the input to said camera until the color as viewed on the screen of said video monitor matches the color on the test print previously made; adjustment of the color filtration levels on the enlarger until the resulting image on the video monitor screen appears to show correct color values; substitution of the transparency to be printed for the standard transparency that was in place within the enlarger during the preceeding steps; adjustment of the filtration levels on the enlarger while inspecting the trace on the oscilloscope to maximize the sharpness of the lines of said trace; further adjustment of the filtration levels on said enlarger until the colors in the image on the video monitor appear to the operator to be optimized; substitution of printing paper in the enlarger for the camera herein described and making of prints from said transparency in the conventional manner.

2. The method according to claim 1 for calibration when prints are to be made from a photographic negative, further comprising the reversal of polarity of said image by inserting an inversion circuit following the output of said camera, the effect being the display of a positive image on said oscilloscope screen and said video monitor screen.

3. The method according to claim 1, further comprising insertion of a field lens to create an aerial image and a prime lens to focus said image onto the receiving element of the camera mentioned above and used during the calibration and adjustment process as described.

4. A method of calibrating a photographic enlarger for the printing of composite pictures, comprising: calibrating adjusting said enlarger for optimal color values for each transparency to be printed, according to the method described in claim 1 or 2 further comprising, notation of the filtration settings of said enlarger for each of said transparencies and exposure of each of said transparencies according to each of such settings using said enlarger in the conventional manner for each exposure, before making the final composite print.

5. An apparatus for calibrating color filtration levels in a photographic enlarger, as augmented by electronic means, comprising: a photographic enlarger using a color subtractor head; a field lens placed below the lens of said enlarger in the light path; said field lens receiving an aerial image of the transparency to be printed upon it; a prime lens placed below said field lens in the light path for intensifying such light as passes through the transparency to be printed; a charge coupled device camera, onto whose sensing member the image of said transparency is focused; an oscilloscope showing a trace, the vertical input of which is the output from said camera and the horizontal input of which is a time sweep of sufficiently high frequency that the resulting waveform appears as a series of unbroken lines and a color video monitor, correctly calibrated, the input of which is the output of the aforementioned camera.

6. The apparatus according to claim 5, further comprising a circuit, inserted following the output of said camera and reversing the polarity of said image, to be used when a negative is to be printed.

* * * * *